United States Patent
Carnell

[15] 3,689,052
[45] Sept. 5, 1972

[54] TORSION BUSHING

[72] Inventor: Brian Leyland Carnell, Milford, Conn.

[73] Assignee: United Aircraft Corporation, East Hartford, Conn.

[22] Filed: Sept. 15, 1970

[21] Appl. No.: 72,476

[52] U.S. Cl. ................................................267/57.1
[51] Int. Cl. ...............................................F16f 1/16
[58] Field of Search .....................267/57.1; 105/199

[56] References Cited

UNITED STATES PATENTS

| | | | |
|---|---|---|---|
| 3,433,177 | 3/1969 | Cripe | 105/199 |
| 3,548,788 | 12/1970 | Lich | 105/199 |

*Primary Examiner*—James B. Marbert
*Attorney*—Vernon F. Hauschild

[57] ABSTRACT

A support arm for the car body of a railway vehicle has a hub provided with an annular resilient mounting on a bolster shaft which includes a bush for carrying radial loads and absorbing radial vibrations that is bonded to an outer housing forming the hub of the arm and is also bonded to an inner sleeve. The sleeve is supported by antifriction bearings on an inner housing which is adjustably secured to the shaft. The inner and outer housings have annular extensions of increased diameter to which a torsion bush of increased radial thickness is attached. The torsion bush is made of softer rubber than the radial bush and provides optimum performance in resisting torsion loads.

9 Claims, 2 Drawing Figures

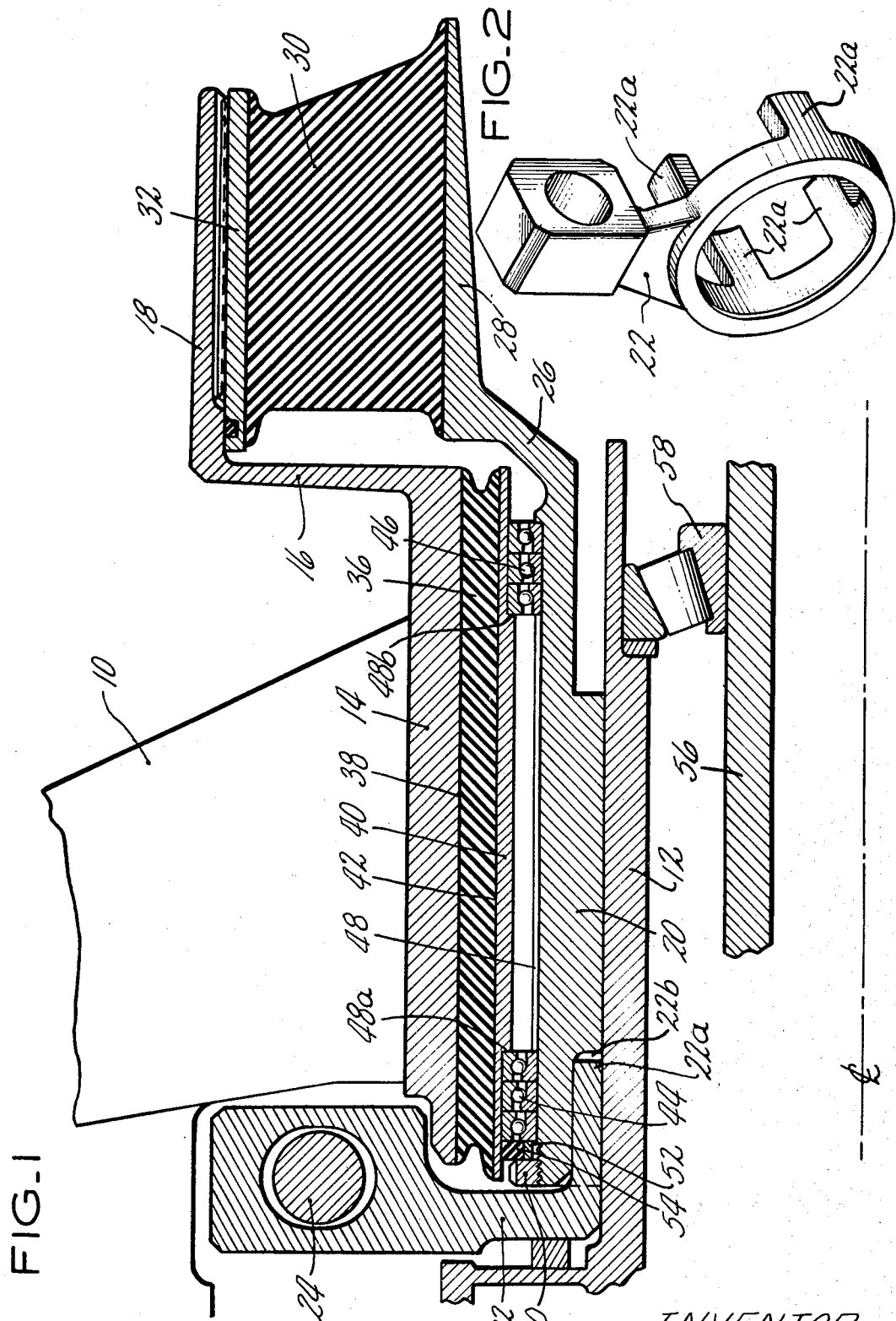

3,689,052

TORSION BUSHING

BACKGROUND OF THE INVENTION

It is known to provide spring support arms for car bodies of railway vehicles in which the arms are mounted at their lower ends on the bolster by means of resilient bushings which provide for rolling movement of the car body as the vehicle enters a curved section of track and, due to the torsional forces exerted on the bushings, return the car body to its normal position as the vehicle leaves the curve. These bushings have been required to absorb both radial loads and torsion loads which has resulted in rubber-metal bond failures due to the high stress levels and high shear angles in the soft rubber which was necessary to meet the torsional stiffness requirements. Spring support arms having bushings of this type are disclosed in U.S. Pat. No. 3,433,177, issued Mar. 18, 1969 to A. R. Cripe and assigned to the assignee of this application. The bushings of this invention are improvements over those disclosed in this patent.

SUMMARY OF THE INVENTION

This invention relates to improvements in spring support arm mountings used to provide both yielding radial support and roll control for the car body of a railway vehicle as it traverses a section of curved track.

It is an object of this invention to provide improved rubber mountings for spring support arms in which the advantages of a high rubber stiffness is provided to secure optimum absorption of radial vibrations and a softer rubber which is stiffer than the existing bush having low stress levels and low shear angles to resist torsion loads.

Another object of the invention is to provide a mounting construction for spring support arms which eliminates rubber-metal bond failures.

A further object of this invention is to separate the radial and torsion loads in the mounting and provide separate rubber bushings which permit the physical properties of the rubber to be optimized for both the torsionally and the radially loaded bushings while retaining the desired resilience for both load conditions.

A still further object of this invention is generally to improve the mountings for spring support arms.

BRIEF DESCRIPTION OF THE DRAWINGS

FIG. 1 is a longitudinal sectional view taken through a resilient mounting for a spring support arm embodying the improvements of this invention; and FIG. 2 is a detail in perspective of an adjustment arm.

DESCRIPTION OF THE PREFERRED EMBODIMENT

The drawing shows the right-hand resilient mounting for the lower end of a spring support arm 10. It will be understood that arm 10 has a similar left-hand mounting and that these mountings are supported on hollow trunnion shafts 12 on the usual bolster of a railway vehicle truck. Reference is made to U.S. Pat. No. 3,433,177, identified above, for a complete disclosure of the environment of the resilient mounting of the present invention.

Spring support arm 10 has a hub 14 which is formed, for the purposes of this invention, with an integral outwardly directed flange 16 and an annular extension 18 concentric with bolster shaft 12. This hub and its extension forms the outer housing for the radial and torsion bushes of the improved mounting.

Bolster shaft 12 has a torsion bush inner housing 20 rotatably mounted thereon which has an adjustment arm 22 attached thereto that is controlled by a threaded shaft 24 mounted on the bolster, hereinafter described. To effect the attachment of arm 22 to housing 20 so the arm 22 and the housing 20 can be rotated in unison on bolster shaft 12 by shaft 24, adjustment arm 22 has four tangs 22a projecting axially therefrom which fit into splines 22b cut in the inner surface of housing 20. Housing 20 has an oblique flange 26 carrying an annular extension 28 which underlies extension 18 and is concentric therewith. An annular torsion bush 30 is bonded at its inner circumference to extension 28 and at its outer circumference to a sleeve 32 which is torsionally secured to extension 18 by splines.

A radial bush 36 is bonded to outer housing 14 at 38 and to a radial bush inner sleeve 40 at 42. Angular contact or other type antifriction bearings 44 and 46 are provided between sleeve 40 and the torsion bush inner housing 20. These bearings have an annular compression sleeve 48 between their inner races and their outer races abut shoulders 48a and 48b on radial bush inner sleeve 40. A screw-threaded spanner nut 50 is provided on housing 20 which engages an annular ring 52 and exerts an axial force on bearings 44 and 46 to preload the bearings. A seal 54 is provided between ring 52 and radial bush inner sleeve 40.

A drag link axle 56 is shown extending into the hollow trunnion shaft 12 which is supported on a tapered roller bearing 58 in this shaft.

Prior to this invention a single bush was provided which absorbed both radial and torsion loads. Such a construction is shown in the Cripe U.S. Pat. No. 3,433,177, referred to above. With this construction, in order to have sufficient resilience to provide passenger comfort it was necessary to make the bush of soft rubber. This resulted in rubber-metal bond failures due to the high torsional stress levels and high shear angles in the soft rubber.

As a result of the construction of the present invention, it is possible to use a hard rubber of optimum stiffness characteristics for transmitting radial loads and absorbing radial vibrations and thus give the desired passenger comfort. Rubber-metal bond failures in the radial bush are eliminated entirely by the presence of the antifriction bearings 44 and 46 which insure that the radial bush will receive no torsion load.

The increased diameter of the rubber-metal bond for the torsion bush 30 and the increased hardness of the rubber help to reduce bond failures in this bush. Also the thicker rubber provided in the torsion bush by the construction of this invention reduces the shear angle in the rubber substantially.

As a result of this invention the stiffness of the radial bush and the torsion bush can be chosen independently to give optimum stiffness characteristics in each bush. This freedom to choose the stiffness of the rubber in each bush independently of the other cannot, however, be done by merely providing separate bushes. This separation of the two functions of the rubber mount must be accomplished without losing the resilience of the mount in absorbing radial loads. Merely to provide another bush to absorb torsion loads is not enough. It must be done in a manner which will not produce a torsion bush which is so stiff in a radial direction that it will prevent the desired resilience to absorb radial loads and vibrations in the radial bush. This is accomplished in the structure of the present invention by making the torsion bush of substantially increased diameter and of softer rubber than the radial bush so as to produce a torsion bush that will yield easily under radial loads allowing the radial bush to carry almost all the applied radial loads.

The radial bush carries the weight of the car bodies but does not need to provide any real "spring action" because of the presence of air springs (not shown) located at the top of the arms 10. The air springs are doughnut-shaped flexible air bags. The radial bushes are resilient only to prevent transmission of vibrations from the wheels through to the car body. Thus it is advantageous to use a stiffer rubber than was possible prior to this invention when torsional stiffness requirements dictated the use of soft rubber.

While, to facilitate description, the radial and torsion bushes have been described herein and in the claims to follow as being made of rubber, the term "rubber" is intended to include all of the various resilient rubber-like materials which are used in place of rubber.

The operation of the improved resilient mount will be clear from the above description. The radial bush 36, being of harder rubber is capable of transmitting radial loads and absorbing radial vibrations and is protected by bearings 44 and 46 from the torsion loads. The torsion bush 30 of harder rubber than the existing bush is capable of absorbing torsion forces without failure and of returning the spring support arm to its neutral position when the torsion stress is removed without failure due to its increased rubber-metal bond area and its increased mass. Also by reason of these features it retains sufficient resilience to allow the radial bush to function efficiently.

Since the threaded shaft 24 is carried by the bolster, housing 20 is fixed relative to the bolster shaft 12 in any adjusted position of arm 22. By turning the threaded shaft 24 a torsional pre-load can be placed on spring arm 10, if desired, to bring it to a neutral position in which the coach body is vertical, i.e. the platform of the coach is level.

I wish it to be understood that I do not desire to be limited to the exact details of construction shown and described, for obvious modifications will occur to a person skilled in the art.

I claim:

1. In combination, a supporting shaft, a torsion bush inner housing fixed to said shaft, a radial bush inner housing spaced from said torsion bush inner housing, a bearing in the space between said housings, means for absorbing radial loads including a bush of radial rubber bonded to said radial bush inner housing, an outer housing bonded to said radial bush having a spring support arm fixed thereto, and means for absorbing torsional loads including a bush of torsional rubber fixed to said outer housing and to said torsion bush inner housing.

2. In combination, a shaft, a generally radial spring support arm, and means for mounting said arm on said shaft including a torsion bush inner housing fixed to said shaft, a radial bush inner housing concentric with and spaced from said torsion bush inner housing, and antifriction bearing in the space between said housings, an outer housing spaced from said radial bush inner housing, a bush of radial rubber between said outer housing and said radial bush inner housing, and a bush of torsion rubber between and fixed both to said outer housing and to said torsion bush inner housing.

3. In combination, a supporting shaft, a generally radial arm, and means for mounting said arm on said shaft for absorbing both radial and torsional loads including a torsion bush inner housing having a small diameter portion fixed relative to said shaft and an extended portion of increased diameter, an antifriction bearing on said smaller diameter portion of said torsion bush inner housing, a radial bush inner housing supported on said bearing, a bush of radial rubber supported on said radial bush inner housing, an outer housing forming the hub of said arm having a small diameter portion supported on said bush of radial rubber and an extended portion of increased diameter which overlies the extended portion of said torsion bush inner housing, and a bush of torsion rubber fixed to the extended portions of said inner and outer housings.

4. The combination of claim 3 in which the bush of torsion rubber has an inner diameter greater than the inner diameter of the radial rubber and has a greater radial thickness than the latter.

5. The combination of claim 3 in which the bond shear area of the bush of torsion rubber is greater than that of the bush of radial rubber.

6. A resilient mounting for an air spring support arm including a hub for said arm, a supporting shaft for said hub, two bushes between said hub and said shaft, one of hard rubber designed to give optimum performance in carrying radial loads and absorbing radial vibrations and the other of softer rubber providing good rubber-metal bonds and torsional stiffness for optimum performance in absorbing torsional loads, and bearings located between said shaft and said soft rubber bush for protecting the latter from torsional loads.

7. The mounting of claim 6 in which the inner circumference of the radial rubber bush is bonded to a sleeve and the bearings are located between said sleeve and the shaft.

8. The mounting of claim 6 in which the inner diameter of the torsional rubber bush is larger than that of the radial rubber bush and its radial thickness is greater than the radial rubber bush.

9. In combination, a supporting shaft, an arm, means for resiliently mounting said arm on said shaft including an outer housing forming the hub of said arm and having an extension of increased diameter, a bush of radial rubber bonded to said hub, an inner housing bonded to said radial rubber bush, a torsion bush inner housing fixed to said shaft, an antifriction bearing between said torsion bush inner housing and said radial bush inner housing, said torsion bush inner housing having an extension of increased diameter concentric with the extension of said outer housing, and a bush of torsion rubber secured to the extensions of said outer and inner housings.

* * * * *